United States Patent

Osugi et al.

[11] Patent Number: 6,160,947
[45] Date of Patent: Dec. 12, 2000

[54] OPTICAL TRANSMISSION MEMBER-FIXED ASSEMBLY

[75] Inventors: Yukihisa Osugi; Akira Hamajima; Shuhei Toyoda; Yoshinari Kozuka; Yoshizumi Nakasuji, all of Nagoya, Japan

[73] Assignee: NCK Insulators, Ltd., Nagoya, Japan

[21] Appl. No.: 09/045,744

[22] Filed: Mar. 20, 1998

[30] Foreign Application Priority Data

Mar. 27, 1997 [JP] Japan ................... 9-075322

[51] Int. Cl.$^7$ ................... G02B 6/36
[52] U.S. Cl. ................... 385/137; 385/65; 385/80; 385/83
[58] Field of Search ................... 385/60, 65, 75, 385/78, 80, 83, 95, 97–99, 136, 137

[56] References Cited

U.S. PATENT DOCUMENTS

| | | | |
|---|---|---|---|
| 4,303,304 | 12/1981 | Ruiz | 385/80 |
| 4,830,456 | 5/1989 | Kakii et al. | 385/75 |
| 4,988,161 | 1/1991 | Fujikawa et al. | 385/68 |
| 5,018,821 | 5/1991 | Kurata | 350/96.2 |
| 5,351,331 | 9/1994 | Chun et al. | 385/97 |
| 5,671,316 | 9/1997 | Yuhara et al. | 385/137 |
| 5,909,528 | 6/1999 | Tamekuni et al. | 385/137 |

FOREIGN PATENT DOCUMENTS

| | | |
|---|---|---|
| 693698 | 1/1996 | European Pat. Off. . |
| 3902574 | 8/1990 | Germany . |
| 4230168 | 8/1993 | Germany . |
| 8286078 | 11/1996 | Japan ................... 385/137 |

OTHER PUBLICATIONS

Patent Abstracts of Japan, vol. 006, No. 212 (P–151), Oct. 26, 1982 & JP 57 118210 A (Nippon Denshin Denwa Kosha), Jul. 23, 1982, Abstract; Figs. 1,2.

*Primary Examiner*—John D. Lee
*Attorney, Agent, or Firm*—Burr & Brown

[57] ABSTRACT

An optical transmission member-fixed assembly including a substrate with a receipt groove in which a core wire of an optical transmission member is received, a lid integrated with the substrate, while between the substrate and the lid is provided a receipt space in which at least a covering of the optical transmission member is received, a dimension of the receipt space being greater than that of the receipt groove when viewed in a width direction, wherein an adhesive is filled around the core wire inside the receipt groove for fixing the core wire there, an adhesive is filled around the optical transmission member within the receipt space for fixing the optical transmission member there, a thickness of the adhesive filled around the optical transmission member inside a boundary space zone between the receipt space and the receipt groove is continuously reduced as a location of the boundary space zone is at least near and goes to an opening of the receipt groove at an end opposed to the receipt space.

3 Claims, 7 Drawing Sheets

FIG_1a

FIG_1b

FIG_1c

FIG_5

OPTICAL TRANSMISSION MEMBER-FIXED ASSEMBLY

BACKGROUND OF THE INVENTION

(1) Field of the Invention

The present invention relates to an improvement in an optical transmission member-fixed assembly comprising a substrate and a lid integrated with the substrate, the substrate being provided with a receipt groove for receiving a core wire of an optical fiber and a receipt seat for receiving at least a covering for the optical fiber.

(2) Related Art Statement

Various types of substrates are known to fix optical fibers having diameters of, for example, around 125 μm. In these substrates, if the optical axis of an optical fiber fixed onto the substrate deviates from a given location, a light transmission loss between the optical fiber and another optical transmission means increases. Therefore, an extremely high working precision such as 0.5 μm or less is required in a fixing groove of the optical fiber-fixing substrate. In such a substrate, grooves each having a V-shaped section are formed in the substrate, each optical fiber is placed in the corresponding groove, and each optical fiber is fixed there with a resin or solder.

Figure 1A:
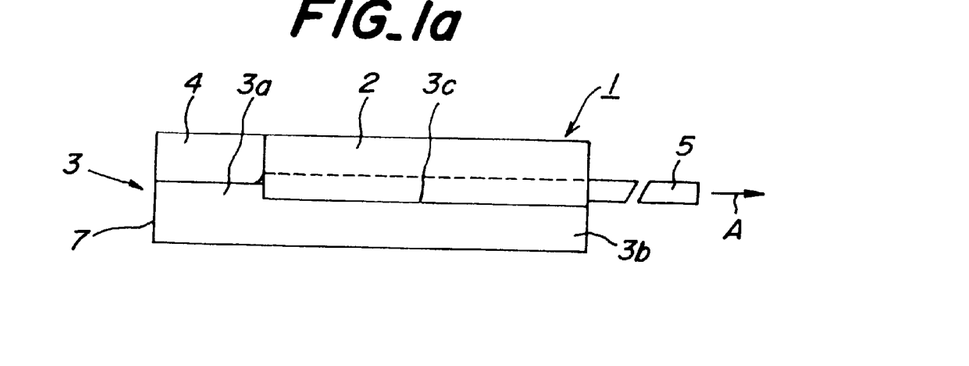
FIG. 1(a) is a front view for schematically illustrating an example of an optical fiber-fixed assembly with an optical fiber-fixing substrate.
Figure 1B:
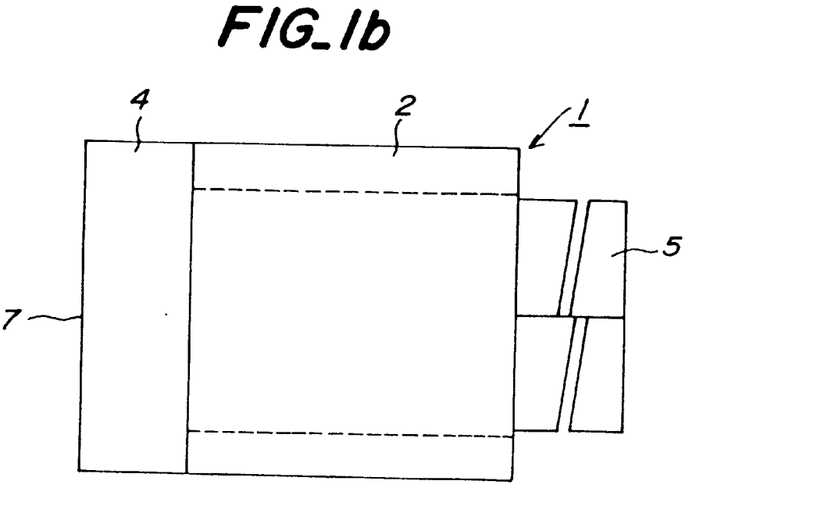
FIGS. 1(b) and 1(c) are a plane view and a left side view for also schematically illustrating this assembly, respectively.
Figure 1C:
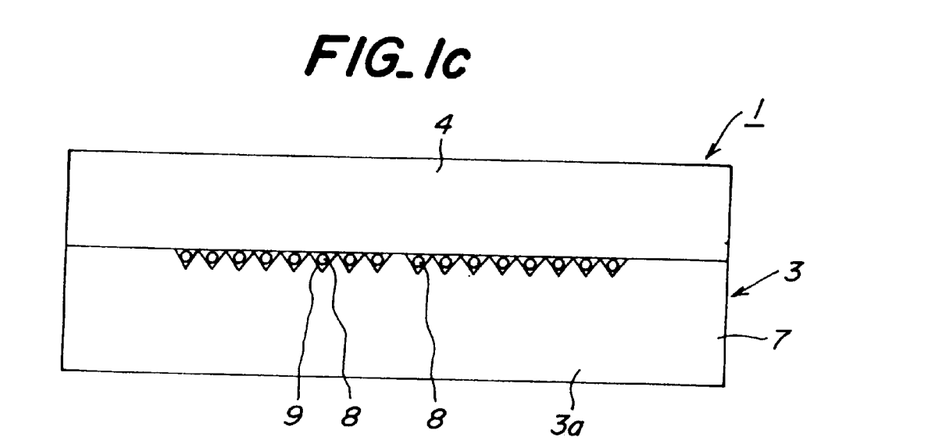

FIG. 1(a) is a front view for schematically illustrating an example of an optical fiber-fixed assembly with such an optical fiber-fixing substrate, and FIGS. 1(b) and 1(c) are a plane view and a left side view for also schematically illustrating this assembly, respectively. The optical fiber-fixed assembly 1 includes a fixing substrate 3 and lids 2 and 4. The fixing substrate 3 includes a receipt seat 3c for receiving optical fibers, covering 5 A lid 2 is placed on the coverings 5. A holding portion 3a of the fixing substrate 3 is provided with given rows of receipt grooves 9. Each groove 9 extends from an end face 7 toward a stepped portion 3b. A core wire 8 of the optical fiber is placed in each groove 9, and fixed there with an adhesive such as a resin. The lid 4 is placed on the holding portion 3a.

Below will be described a process for producing such an optical fiber-fixed assembly. First, an optical fiber-fixing substrate is prepared from ceramic or glass. Each receipt groove 9 is as, thin as, for example, one hundred to dozens of microns. A core wire 8 of an optical fiber is inserted in each groove 9.

However, the present inventors discovered that the above optical fiber-fixed assembly might suffer from the following problems. That is, the fixed assembly is desired to suppress the insertion loss of the light to a given area over a wide temperature range. The optical fiber-fixed assembly is often arranged in a very low temperature environment. Alternatively, if the optical fiber-fixed assembly is arranged in an automobile, it may reach a temperature of 85° C. even in the shade depending upon the location of the automobile.

More specifically, the operational temperature environment of optical parts mounted in automobiles is classified into the following three cases. That is, if the optical part is mounted in the trunk space, the optical part needs to withstand temperature changes in a range of –20° C. to +60° C. If it is mounted in the vehicle compartment into which sun light does not directly enter, it needs to withstand temperature changes in a range of –40° C. to +85° C. lastly, when the optical part is mounted in the engine compartment, it needs to withstand temperature changes in a range of –40° C. to +120° C.

Accordingly, the present inventors produced optical-fiber fixed assemblies each having a configuration as shown in FIGS. 1(a) to 1(c), placed each of them in a given package and then subjected the package to a heat impact test and a heat cycle test over a wide temperature range of for example –40° C. to +85° C. As a result, it was revealed that defective packages having their light insertion loss remarkably reduced might occur after the heat impact test or the heat cycle test, which might cause reduction in yield.

SUMMARY OF THE INVENTION

The present invention is designed to prevent deterioration of light transmission characteristics such as the light insertion loss even under application of heat impacts or heat cycles over a wide temperature range with respect to the optical transmission member-fixed assembly which includes a substrate with a receipt groove for receiving a core wire of the optical transmission member and a lid integrated with the substrate, while a receipt space is provided between the substrate and the lid for receiving at least the covering of an optical transmission member.

The present invention relates to an optical transmission member-fixed assembly which comprises a substrate with a receipt groove in which a core wire of an optical transmission member is received, a lid integrated with the substrate, while between the substrate and the lid is provided a receipt space in which at least a covering for an optical transmission member is received, a dimension of the receipt space being greater than that of the receipt groove when viewed in a vertical direction to the optical transmission member, wherein an adhesive is filled around the core wire inside the receipt groove for fixing the core wire there, an adhesive is filled around the optical transmission member within the receipt space for fixing the optical transmission member there, a boundary space zone is provided between the receipt space and the receipt groove, a thickness of the adhesive filled around the optical transmission member inside the boundary space is continuously reduced as a location of the boundary space zone is at least near and extends to an opening of the receipt groove at an end opposed to the receipt space.

These and other objects, features and advantages of the invention will be well appreciated upon reading of the following description of the invention when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

In the following, the construction, function and effects of the present invention will be successively explained.

The present inventors produced optical fiber-fixed assemblies as shown in, for example, FIGS. 1(a) to 1(c), placed and sealed each of them in a given package, and subjected such packages to a heat impact test and heat cycle test. At that time, defective products having light insertion loss conspicuously reduced in some cases. The present inventors investigated this phenomenon according to the following process, determined the cause therefor, and reached the present invention based on this determination.

More specifically, the present inventors first noted differences in dimensional changes between the packages and the optical fiber-fixed assemblies when the temperature changed. Since the optical fibers are fixed to both the package and the optical fiber-fixed assembly, it was thought that the package moved relative to the optical fiber-fixed assembly in compliance with changes in temperature, and consequently tensile stress was applied to the optical fiber.

In order to confirm this, the present inventors conducted an experiment in which optical fibers were pulled out from optical fiber-fixed assemblies. As a result, it turned out that a pulling force of about 0.49 kgf was required to pull out each optical fiber. Further, the inventors conducted an experiment in which after the optical fibers were sealingly fixed to the package, the optical fibers were pulled out from the package. Consequently, a pulling force of about 0.116 kgf was required for each optical fiber. As is seen from the above, since the pulling force required to pull out the optical fiber from the optical fiber-fixed assembly was far greater than that required to pull out the optical fiber from the package, it is highly possible that the optical fiber is broken inside the optical fiber-fixed assembly by such pulling force.

Furthermore, after optical fibers were actually assembled in an optical fiber-fixing assembly, pulling force was applied to the optical fibers and behavior of the optical fibers was measured. Fourteen optical fiber-fixed assemblies were subjected to the experiment. As a result, the optical fibers were broken at boundary between the receipt groove 9 and the receipt seat 3c in two assemblies, and the optical fibers were broken inside the receipt groove 9 in nine assemblies, whereas the optical fibers were pulled out from three fixing assemblies.

On the other hand, defective optical fiber-fixed assemblies occurred after the heat impact test or the heat cycle test were actually dissembled and examined. It turned out that the optical fibers were broken near the boundaries between the receipt grooves 9 and the receipt seat 3c in most of them. Therefore, these observation results were contradictory to the hypothesis that the optical fibers were broken by the pulling forces given to them from the outside of the fixed assemblies.

Next, the defective optical-fiber fixed assemblies after the heat impact test or the heat cycle test were dissembled, and the state of broken faces at broken locations of the optical fibers was observed. The broken face exhibited almost the state shown in FIG. 2. On the other hand, fresh optical fibers were actually broken by applying tensile stress or bending stress to them, their broken faces were observed, and compared with those of the optical fibers of the actual assemblies.

Figure 2:
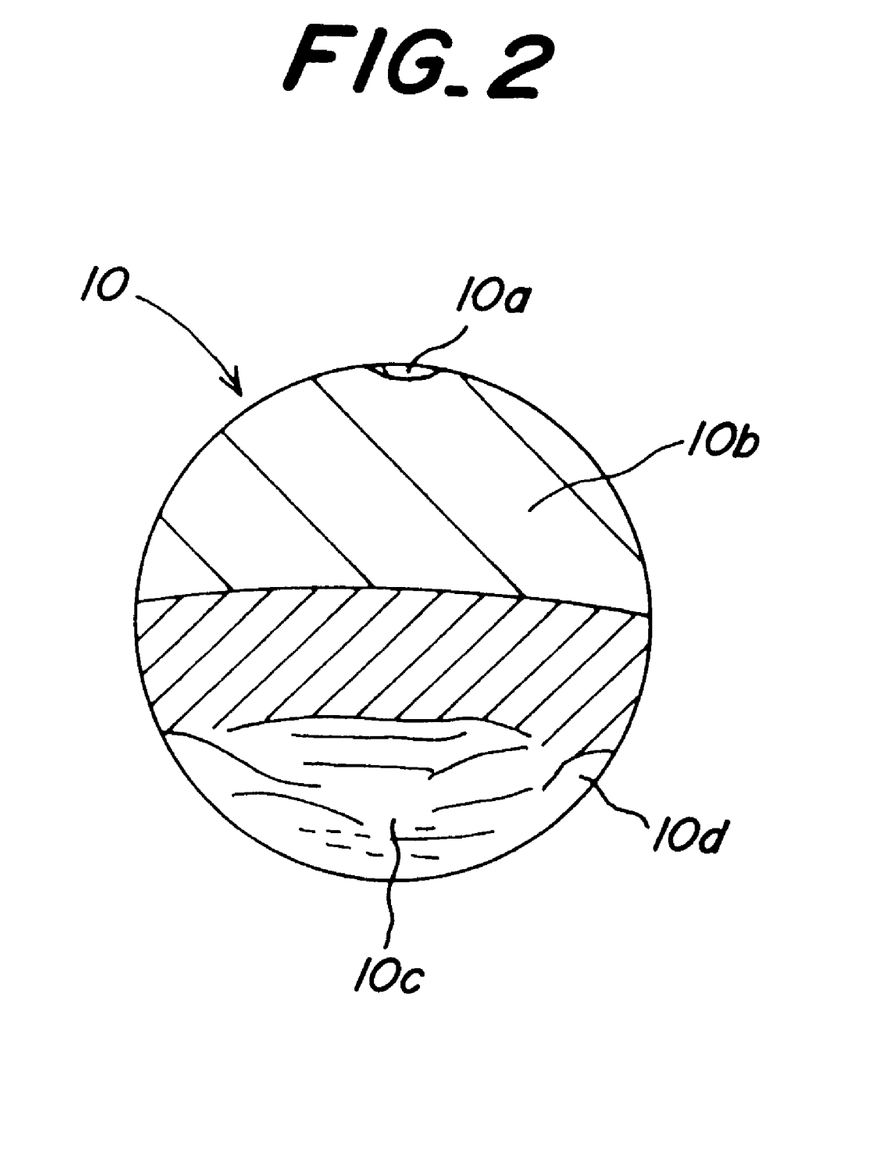
FIG. 2 is a front view for illustrating a broken section face of a cut of an optical fiber that occurred after a heat impact test or a heat cycle test in the optical fiber-fixed assembly.

It turned out that the state of the broken face 10 at the broken location of the defective optical fiber occurred after the heat impact test or the heat cycle test did not resemble that of the broken face seen in the fresh optical fiber broken by the tensile stress, and that the former resembled the state of the broken face of the optical fiber broken by bending stress.

Further, analysis of the state of the broken face 10 shown in FIG. 2 reveals different states 10a, 10b and 10c. These states of the broken face can be analyzed as follows. That is, when bending stress is applied to the optical fiber, tensile stress is concentrated locally at a portion of the optical fiber at a peripheral edge, the optical fiber begins to be broken at 10a as a breakage-stating point by the tensile stress. Such breakage relatively slowly proceeds from the starting point 10a to form an initial-stage broken face 10b. When the breakage proceeds to some extent, such breakage rapidly proceeds in the lower side of the optical fiber in FIG. 2. Thus, a broken face 10c different from the initial-stage one 10b is formed. A portion 10d corresponds to just a contact between the optical fiber and an optical fiber-receiving groove (in this experiment, so-called V-shaped grooves were employed), and breakage speedily proceeds near the contact, thereby forming the rapidly breakage-proceeded face 10d.

It is considered from the analysis results that since the bending stress was applied to the optical fiber, the optical fiber was broken near the boundary between the receipt groove and the receipt seat, causing increase in the light insertion loss.

Figure 3:
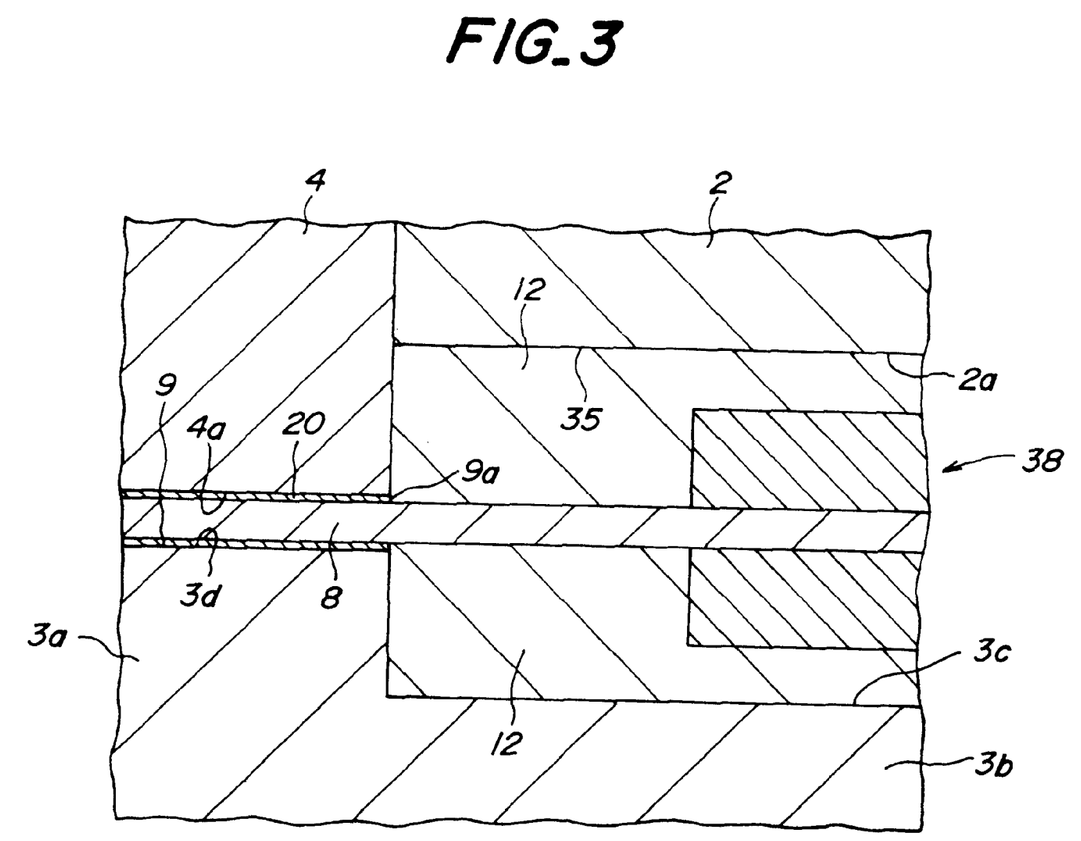
FIG. 3 is a sectional view for showing a structure near a boundary between a receipt groove 9 and a receipt space 38 in an optical fiber-fixed assembly as a comparative example.

Next, the present inventors advanced their investigation to solve the cause for breakage of the optical fiber under application of bending stress. The present inventors dissembled defective optical fiber-fixed assemblies after the heat impact test or the heat cycle test, analyzed them in detail, and reached the following discovery. FIG. 3 is a sectional view of illustrating near the boundary between the receipt groove 9 and the receipt seat 3c in the optical fiber-fixed assembly before the heat impact test or the heat cycle test in an enlarged scale.

In the receipt groove 9, an adhesive layer 20 is provided between the outer peripheral surface of a core wire of the optical fiber an the bottom face 3d of the receipt groove 9 and between the outer peripheral surface of the core wire 8 and a wall surface 4a of the lid 4 so that the core wire 8 may be surrounded by the adhesive layer. The core wire 8 extends to a side of the receipt seat 3c through an outlet 9a of the receipt groove 9. The lid 2 is provided with a rectangular parallelepiped receiving seat 35 for receiving at least a covering for the optical fiber. A receipt space 38 is defined by the receipt seats 3c and 35. The adhesive layer 12 is bonded to wall faces of the substrate 3 and the wall 2a of the lid 2.

Figure 4:
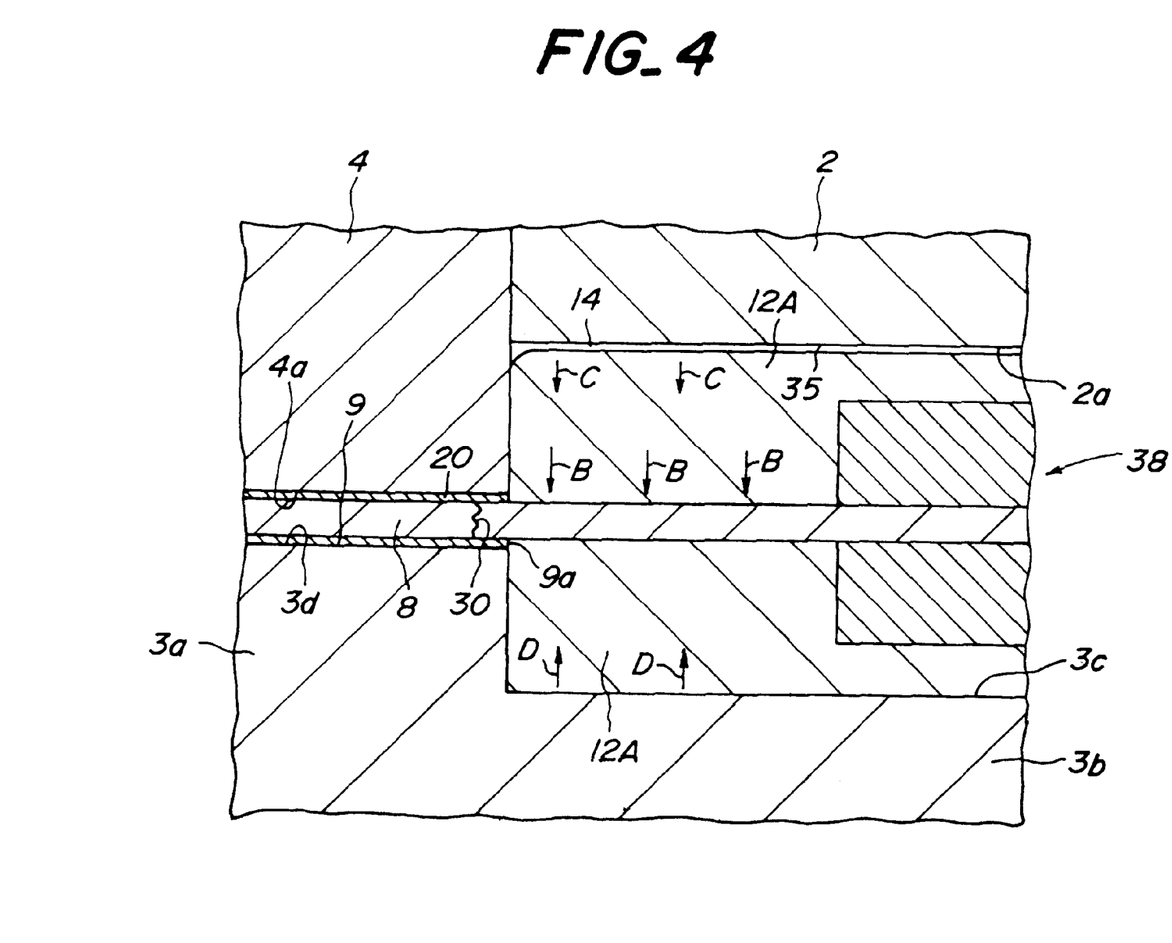
FIG. 4 is a sectional view for illustrating the state of the optical fiber-fixed assembly having the structure shown in FIG. 3 after the heat cycle test or the heat impact test.

After heat impact or heat cycles were applied to such optical fiber-fixed assemblies, resultant defective assemblies were dissembled and observed. This showed that as shown in FIG. 4, the adhesive layer 12A peeled from the wall face 2a of the lid 2, and a very small gap 14 was formed therebetween.

From the observation results, the cause for the breakage of the optical fiber is considered as follows. That is, it is considered that as the temperature lowers, the adhesive shrinks around and toward the optical fiber as shown by arrows C and D, and that since the resin is not uniform at every portion in terms of density, etc., the adhesive is non-uniformly shrunk around the optical fiber. It is further considered that when a part of the outer peripheral portion of the adhesive layer 12 peels from the lid 2 or the substrate 3, bending stress is rapidly applied to this peeled part of the adhesive as shown by an arrow B. The core wire 8 is likely broken at location 30 by this bending stress.

Further, the present inventors assembled optical fiber-fixed assemblies by using an epoxy resin adhesive or acrylic resin UV-curable type resin adhesive as an adhesive, and subjected them to the heat impact test or the heat cycle test. The elastic modulus and the coefficient of thermal expansion of the epoxy resin adhesive were 35 kg/cm$^2$ and $1.8 \times 10^{-4}/°$C., respectively. The elastic modulus and the coefficient of thermal expansion of the acrylic UV-curable type resin adhesive were 3900 kg/cm$^2$ and $0.8 \times 10^{-4}/°$ C., respectively.

Since the coefficient of thermal expansion of the epoxy resin adhesive is greater than that of the acrylic one and therefore displacement of the former is not less than 2 times that of the latter when the temperature changes, it can be presumed that the number of defective assemblies is greater in the case of the epoxy resin adhesive. However, it turned out that the occurrence percentage of defective assemblies was far higher with a lower yield in the use of the acrylic UV-curable resin adhesive than in the use of the epoxy resin adhesive. The reason is that since the acrylic UV-curable type resin adhesive has a lower elastic modulus, it is likely to peel from the wall surface of the lid and its stress is larger, even if the displacement is small.

JP-A-8 286078 proposes that a core wire-holding portion is provided higher than an optical fiber-placing portion, a corner portion of a step due to a difference in height is designed to have a curvature or an obtuse angle. Although the present inventors produced optical transmission member-fixed assemblies having such structures, it turned out that their light transmission characteristic degraded against severe heat impact and heat cycles applied over the above-mentioned wide temperature range.

Based on the above discovery, the present inventors found it most important to continuously decrease the thickness of the adhesive around the optical transmission member in the boundary zone between the receipt space and the receipt grooves at least near openings of the receipt grooves as the location of the receipt space goes toward the receipt grooves. The inventors reached the present invention based on this finding.

In the present invention, it is particularly preferable to continuously decrease the thickness of the adhesive around the optical transmission member inside the boundary zone at a constant volume-decreasing rate as the location of the boundary zone extends near the openings at the ends of the receipt grooves. In this case, it is most preferable to continuously decrease the thickness of the adhesive around the optical transmission member inside the boundary zone at a constant volume-decreasing rate as the location of the boundary zone extends from the end of the receipt space to the opposed ends of the receipt grooves.

Figure 5:
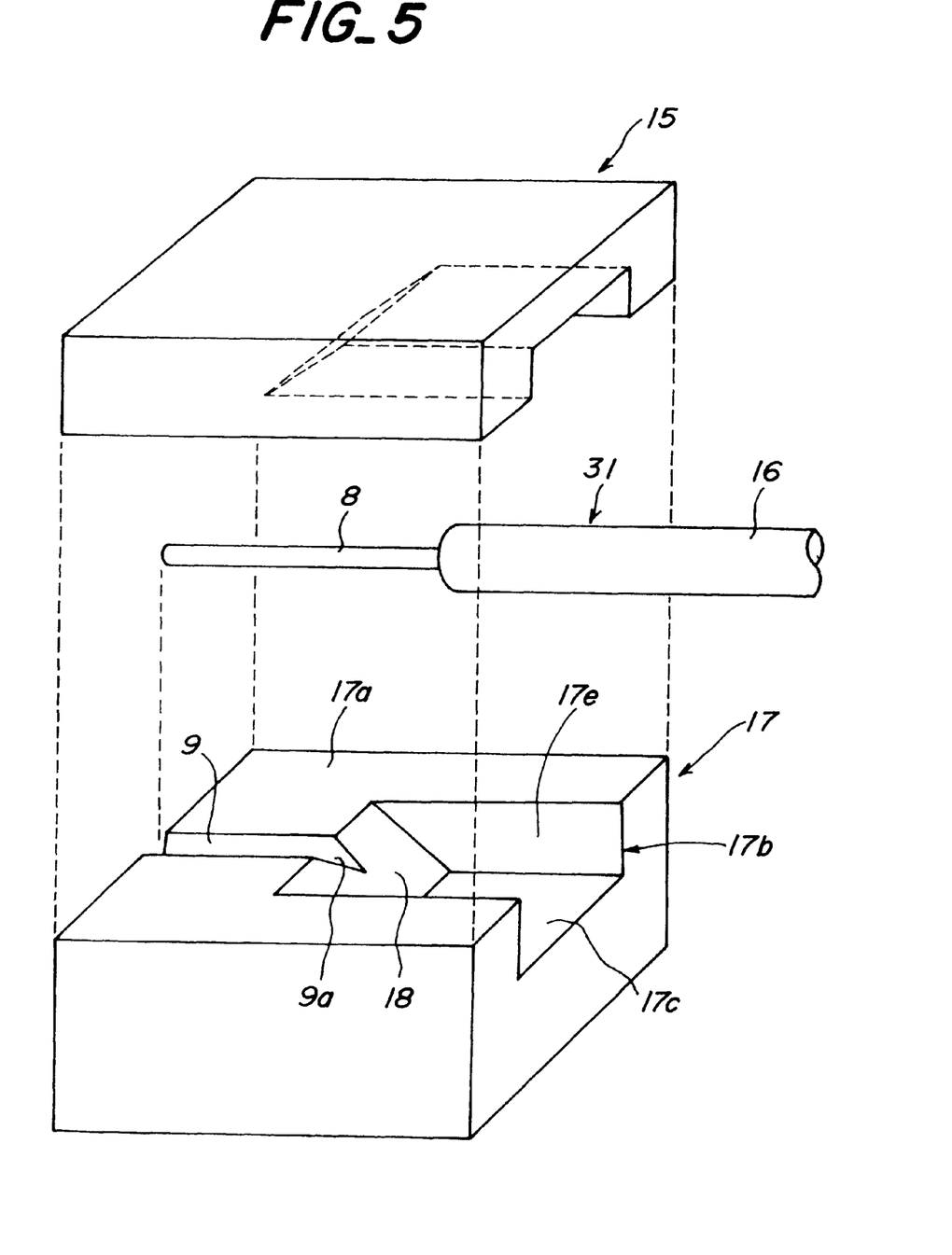
FIG. 5 is a perspective view for illustrating an optical fiber-fixed assembly according to an embodiment of the present invention in a decomposed state.
Figure 6:
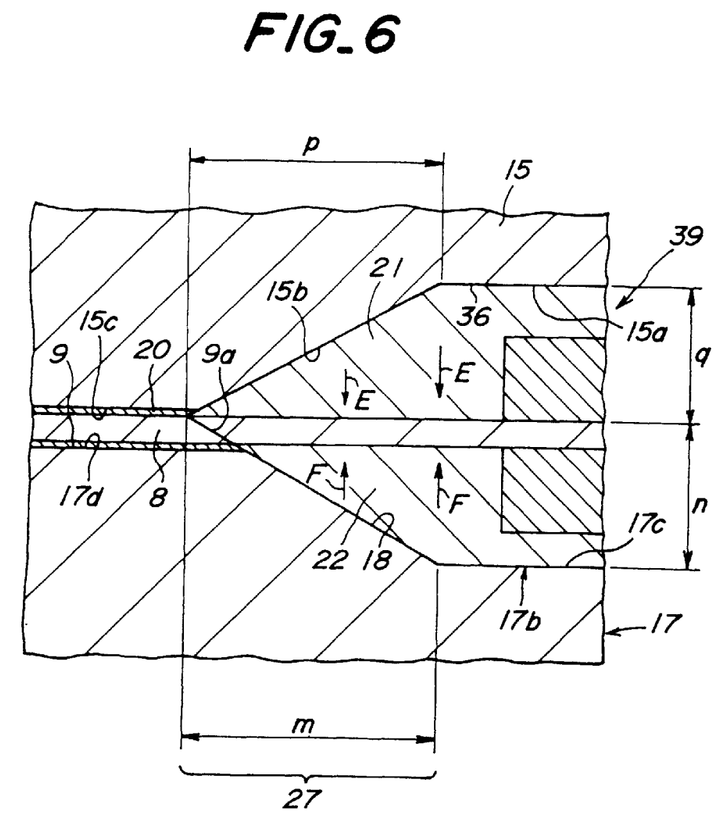
FIG. 6 is a sectional view for illustrating the structure of near a boundary portion between receipt grooves 9 and receipt space 39 in the optical fiber-fixed assembly of FIG. 5.

FIG. 5 is a perspective view for illustrating an embodiment of thus constructed optical fiber-fixed assembly according to the present invention in a dissembled state. FIG. 6 is a sectional view of illustrating a boundary zone between a receipt groove 9 and a receipt seat 17 in the assembly of FIG. 5 in an enlarged scale. A lid 15, an optical fiber 31 composed of a covering 16 and a core wire 8 and a substrate 17 are assembled together, while a surface 17a of the substrate 17 is opposed to the lid 15.

An adhesive layer 20 is provided inside the receipt groove 9 between the outer peripheral surface of the core wire 8 of the optical fiber and a bottom surface 17d of the receipt groove 9 and between the outer peripheral surface of the core wire 8 and a wall surface 15c of the lid 15 such that the adhesive layer may surround the core wire. The core wire 8 extends into a side of the receipt space 17b through an end 9a of the receipt groove 9. An adhesive layer 22 is provided between the wall surface 17 of the receipt space 17b and the core wire, and the adhesive layer 22 is bonded to the wall surface 17c. Although not shown in FIG. 6, an adhesive layer is filled between the side wall surface 17e of the receipt seat and the optical fiber 31.

The lid 15 is provided with a receipt seat 36 for receiving at least the covering of the optical fiber. An adhesive layer 21 is provided between the wall surface 15a of the lid 15, and is bonded to the wall surface 15a. A receipt space 39 is defined by the receipt seat 17b and the receipt seat 36 of the lid.

In a boundary zone 27 between the receipt space 39 and the receipt groove 9 is provided an almost flat inclined surface 18 at a location from near the end opening 9a of the receipt groove 9 to the receipt seat 17b. The adhesive layer 22 is also bonded to the inclined surface 18.

Further, the lid 15 is provided with an almost flat inclined surface 15b extending from the end opening 9a of the receipt groove 9 to the receipt space 39, and the adhesive layer 21 is bonded to the inclined surface 15b. As a result, the thickness of the adhesive layer 21 and that of the adhesive layer 22 continuously decrease as the location extends from the receipt space 39 toward the end opening 9a of the receipt groove 9.

In such a fixed assembly, the adhesive is shrunk around and toward the optical fiber as shown by arrows E and F as the temperature lowers. At that time, if the adhesive is non-uniformly shrunk around the optical fiber, the thicknesses of the adhesive layers 21 and 22 first continuously decrease in the boundary zone 27, so that the shrunk amounts of the adhesive in the directions E and F gradually decrease as the location approaches the receipt groove 9. For this reason, the nearer to the receipt groove 9 the location, the more difficult for the adhesive layers 21, 22 to peel from the substrate and the lid.

If the shrunk amounts of the adhesive layers 21, 22 become large, the adhesive layers 21, 22 are likely to peel from the wall surfaces 15a and the 17c, that is, the adhesive layers are more likely to peel in an area outside the boundary zone 27. As a result, bending stress of the adhesive layer through deformation thereof is not so applied to near the opening 9a of the receipt groove, but dispersed over the entire length of the boundary zone 27. As a result, it is unlikely the optical fiber will be broken.

In addition, it is indispensable that the thicknesses of the adhesive layers 21, 22 particularly near the end opening 9a of the receipt groove 9 is continuously decreased, whereas the adhesive layer at a side of the end of the adhesive layer contributes to a smaller extent. The term "near the opening 9a" means an area falling within 1 mm from the opening 9a.

In FIG. 6, it is preferable to set ratios p/q and m/n at not less than 0.70 in which p and m are sizes of the inclined surfaces 15b and 18 as viewed in a longitudinal direction of the optical fiber, respectively, wherein q and n are sizes of the inclined surfaces 15b and 18, respectively, as viewed in a vertical direction to the optical fiber. By so doing, the effect of preventing the cut of the optical fiber becomes conspicuous. In this case, q/p+n/m means a volume-decreased rate. On the other hand, p/q and m/n are preferably not more than 11.5, because the dimension of the receipt space 39 as viewed in the longitudinal direction of the optical fiber can be prevented from being excessive.

Figure 7:
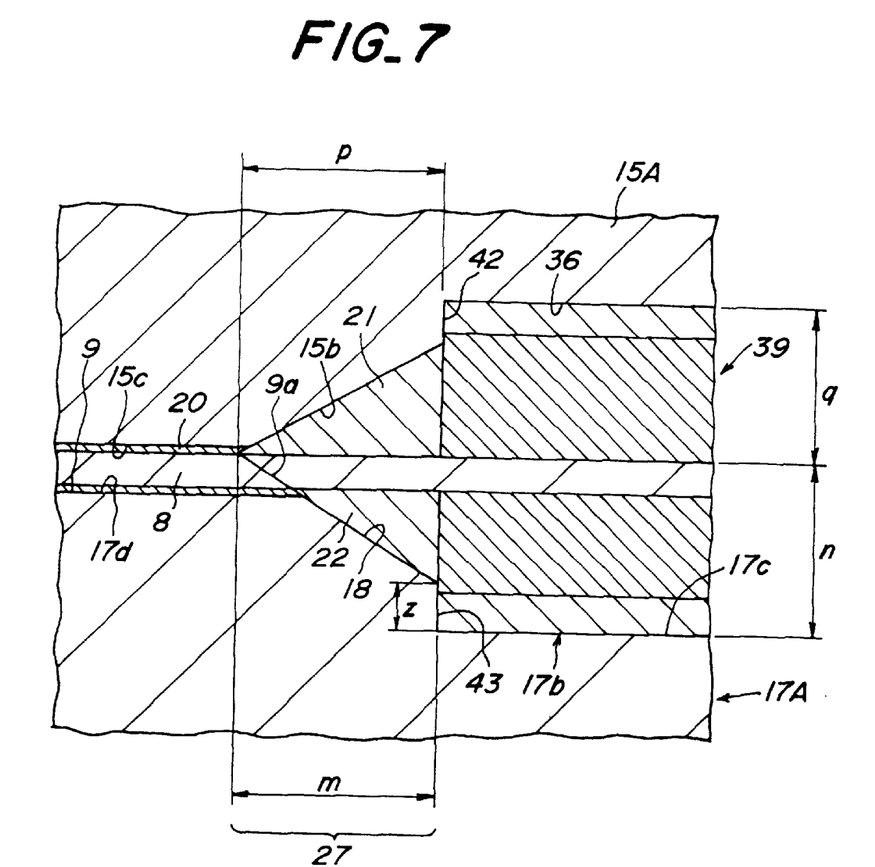
FIG. 7 is a sectional view of illustrating a principal portion of an optical fiber-fixed assembly according to another embodiment of the present invention.

In the embodiment shown in FIGS. 6 and 7, since the inclined surfaces 15 and 18 are almost flat, they can be easily formed by working or the like. However, each of the inclined surfaces need not be flat, and may be of an arbitrary curved shape or of a stepwise shape, so long as the thickness of the adhesive around the optical transmission member within the receipt space 39 can be continuously decreased as the location of the boundary zone extends from the receipt space 39 toward the receipt groove 9.

In the present invention, it is preferable that on the side of the substrate is provided a reference surface for arraying the covering of the optical transmission member near the end of the receipt space.

FIG. 7 is a sectional view of a principal portion of another embodiment of the optical transmission member-fixed assembly according to the present invention. In FIG. 7, the same parts as in FIG. 6 are given the same reference numerals, and their explanation is omitted.

In the present assembly, a reference surface 43 having a height "z" is formed between an end side of an inclined surface 18 of a substrate 17A and a receipt seat 17b. When a covering of an optical fiber is to be received and arrayed inside a receipt seat 17b, the covering of the optical fiber can be located by contacting an end face of the covering with this reference face 43.

In the present embodiment, the lid 15A is provided with a vertical surface 42 between the end of the receipt seat 15a and an inclined surface 15b, and the covering can be located by the vertical surface 42.

Symbols m, n, p and q are mentioned above.

In the present invention, the optical transmission member is preferably the optical fiber, but the optical transmission member may be a passive optical transmission member such as a rod lens.

The contour of the receipt groove formed in the optical fiber-fixing substrate is preferably a so called V-shape, but grooves having other sectional shapes may be employed. Further, a receipt groove may be formed in a substrate made of a silicon material by etching the substrate. The receipt groove may be formed by grinding a substrate made of a ceramic material such as alumina, agate or zirconia, or a glass material. In this case, for example, the receipt groove is formed by preparing a sintered body through sintering a ceramic molded body, forming a flat surface by plane grinding the sintered body, and then grinding the flat surface with diamond. Alternatively, the receipt groove may be formed by press molding.

In the present invention, a constant "c" is preferably not less than 1.2, this constant "c" being a constant in the following formula which represents a volume-reduced rate of the thickness of the adhesive around the optical transmission member within the boundary zone. In this case, stability of the optical transmission member-fixed assembly after the heat impact and the heat cycles applied over a temperature range of −20° C. to +60° C. is largely improved.

Volume-reducing percentage (%)=(−log (a×b)×100))×100/c a: elastic modulus (kg/mm$^2$), b: coefficient of thermal expansion of adhesive (° C.)

If the above constant "c" is not less than 2.0, stability after the heat impact and the heat cycles over a temperature range of −40° C. to +85° C. is conspicuously improved.

Further, if the constant "c" is not less than 2.5, stability after the heat impact and the heat cycles over a temperature range of −40° C. to +120° C. is conspicuously improved.

The constant "c" is preferably not more than 10 in order to make the dimension of the optical transmission member-fixed assembly in a practical range.

More specific embodiments will be explained below.

EXAMPLE 1

An optical fiber-fixed assembly having the structure shown in FIG. 3 and an optical fiber-fixed assembly having the invention structure shown in FIG. 6 were produced. Substrates 3, 17 each having a dimension of 5.0 mm×2.5 mm×2.0 mm and lids 2, 15 having a dimension of 4.5 mm×1.5 mm×1.0 mm were repaired from optical glass. A single groove 9 was formed in each substrate by a slicing machine.

Then, a receipt seat 3c having a rectangular parallelepiped shape was formed in the structure as comparative example by ultrasonic wave working. This receipt seat 3c had a dimension of 2 mm length×0.8 width×0.25 mm depth. A receipt seat 35 was formed by ultrasonically working the lid 2. The receipt seat 35 had a dimension of 1.5 mm length×0.8 width×0.15 mm depth.

In the structure of the invention example, a receipt seat 17b having a rectangular parallelepiped shape was formed by ultrasonic wave working. This receipt seat 17b had a dimension of 2 mm length×0.8 width×0.25 mm depth. A receipt seat 36 was formed by ultra-sonically working the lid 15. The receipt seat 36 had a dimension of 1.66 mm length×0.8 width×0.15 mm depth.

Then, the lid 15 and the substrate 17 were worked by a micro-grinder, thereby forming inclined surfaces 15b and 18 having shapes as shown in FIG. 6. In FIG. 6, m was 0.43 mm, n 0.25 mm, p 0.24 mm and q 0.15 mm.

A polarized face-holding optical fiber having an outer clad diameter of 80 μm was used as an optical fiber. An epoxy resin adhesive was used as an adhesive. Each of the fixed assemblies of the invention example and the comparative example was subjected to a heat cycle test. More specifically, the assembly was heated from room temperature to 85° C. at a rate of 25° C./min., held at 85° C. for one hour, cooled down to −40° C. at a rate of 25° C./min., and held at −40° C. for one hour. This cycle was repeated at 450 times.

After the above heat cycles, the light insertion loss of each assembly was measured, and assemblies in which the insertion loss was reduced by not less than 1 dB as compared with before the test were judged "rejected". In the fixing assemblies of the comparative example, five were rejected among forty. To the contrary, in the fixed assemblies according to the invention, none were rejected among forty. Dissembling and inspection of the rejected assemblies among the ones in the comparative example gave observation results as mentioned above.

EXAMPLE 2

Fixed assemblies in the invention example and comparative example were produced, and subjected to the heat cycle test in the same manner as in Example 1. An acrylic UV-curable type resin adhesive was used instead of the epoxy resin adhesive.

As result, in the fixing assemblies of the comparative example, thirty two were rejected among forty. To the contrary, in the fixed assemblies according to the invention, none were rejected among forty. Dissembling and inspection of the rejected assemblies among the ones in the comparative example gave observation results as mentioned above.

EXAMPLE 3

Optical transmission member-fixed assemblies each having the structure shown in FIG. 6 were produced in the same manner as in Example 1. Resins used were A or B shown in Table 1.

TABLE 1

| | Kind of resin | Elastic modulus kg/mm$^2$ | Coefficient of heat expansion/° C. |
|---|---|---|---|
| A | Epoxy resin | 0.35 | $1.6 \times 10^{-4}$ |
| B | Acrylic resin | 39 | $0.8 \times 10^{-4}$ |

For reference, calculated volume-reduced percentages corresponding to c=1.2, 2.0 and 2.5 are shown in Table 2 with respect to the resins A and B.

TABLE 2

| Resin | c = 1.2 | c = 2.0 | c = 2.5 |
|---|---|---|---|
| A | 354% | 213% | 170% |
| B | 209% | 125% | 100% |

With respect to Experiment Run Nos. 1 to 40 in Tables 3 and 4, the constant "c", the taper angle of the substrate, and the taper angle of the lid were calculated from the used resin, the volume-reduced percentage and the structure. With respect to each assembly, a 1300-cycle heat impact test was effected with respect to each combination of a lower limit temperature/upper limit temperature shown in Tables 5 and 6 under the following condition: retaining time of 1 hour and time required for temperature change of 5 minutes or less.

TABLE 3

| No. | Resin used | Volume-reduced rate (%) | "c" determined from volume-reduced rate | taper angle of substrate (°) | taper angle of lid (°) |
|---|---|---|---|---|---|
| 1 | A | 460 | 0.924 | 66.5 | 66.5 |
| 2 | A | 360 | 1.181 | 60.9 | 60.9 |
| 3 | A | 355 | 1.198 | 60.6 | 60.6 |
| 4 | A | 353 | 1.204 | 60.5 | 60.5 |
| 5 | A | 340 | 1.250 | 59.5 | 59.5 |
| 6 | A | 340 | 1.250 | 25.5 | 71.1 |
| 7 | A | 34D | 1.250 | 71.1 | 25.5 |
| 8 | A | 250 | 1.700 | 51.3 | 51.3 |
| 9 | A | 220 | 1.932 | 47.7 | 47.7 |
| 10 | A | 214 | 1.987 | 46.9 | 46.9 |
| 11 | A | 212 | 2.006 | 46.7 | 46.7 |
| 12 | A | 210 | 2.024 | 46.4 | 46.4 |
| 13 | A | 200 | 2.126 | 45.0 | 45.0 |
| 14 | A | 180 | 2.362 | 42.0 | 42.0 |
| 15 | A | 172 | 2.472 | 40.7 | 40.7 |
| 16 | A | 170 | 2.501 | 40.4 | 40.4 |
| 17 | A | 160 | 2.657 | 38.7 | 38.7 |
| 18 | A | 160 | 2.657 | 15.0 | 53.1 |
| 19 | A | 160 | 2.657 | 53.1 | 15.0 |
| 20 | A | 100 | 4.252 | 26.6 | 26.6 |

TABLE 4

| No. | Resin used | Volume-reduced rate (%) | "c" determined from volume-reduced rate | taper angle of substrate (°) | taper angle of lid (°) |
|---|---|---|---|---|---|
| 21 | B | 300 | 0.835 | 56.0 | 56.0 |
| 22 | B | 215 | 1.166 | 47.0 | 47.0 |
| 23 | B | 210 | 1.193 | 46.4 | 46.4 |
| 24 | B | 208 | 1.205 | 46.1 | 46.1 |
| 25 | B | 205 | 1.222 | 45.7 | 45.7 |
| 26 | B | 205 | 1.222 | 25.5 | 57.6 |
| 27 | B | 205 | 1.222 | 57.6 | 25.5 |
| 28 | B | 160 | 1.566 | 38.7 | 38.7 |
| 29 | B | 130 | 1.928 | 33.0 | 33.0 |
| 30 | B | 126 | 1.989 | 32.2 | 32.2 |
| 31 | B | 124 | 2.020 | 31.8 | 31.8 |
| 32 | B | 120 | 2.088 | 31.0 | 31.0 |
| 33 | B | 110 | 2.278 | 28.8 | 28.8 |
| 34 | B | 105 | 2.387 | 27.7 | 27.7 |
| 35 | B | 101 | 2.481 | 26.8 | 26.8 |
| 36 | B | 99 | 2.531 | 26.3 | 26.3 |
| 37 | B | 95 | 2.638 | 25.4 | 25.4 |
| 38 | B | 95 | 2.638 | 15.0 | 34.3 |
| 39 | B | 95 | 2.638 | 34.3 | 15.0 |
| 40 | B | 80 | 3.132 | 21.8 | 21.8 |

TABLE 5

Number of broken optical fibers/ Total number of optical fibers tested

| No. | −20° C./+60° C. | −40° C./+85° C. | −40° C./+120° C. |
|---|---|---|---|
| 1 | 12/30 | 12/30 | 27/30 |
| 2 | 15/30 | 15/30 | 22/30 |
| 3 | 11/30 | 11/30 | 23/30 |
| 4 | 0/30 | 3/30 | 5/30 |
| 5 | 0/30 | 4/30 | 6/30 |
| 6 | 0/30 | 2/30 | 4/30 |
| 7 | 0/30 | 4/30 | 4/30 |
| 8 | 0/30 | 3/30 | 5/30 |
| 9 | 0/30 | 3/30 | 4/30 |
| 10 | 0/30 | 2/30 | 5/30 |
| 11 | 0/30 | 0/30 | 4/30 |
| 12 | 0/30 | 0/30 | 3/30 |
| 13 | 0/30 | 0/30 | 5/30 |
| 14 | 0/30 | 0/30 | 6/30 |
| 15 | 0/30 | 0/30 | 4/30 |
| 16 | 0/30 | 0/30 | 0/30 |
| 17 | 0/30 | 0/30 | 0/30 |
| 18 | 0/30 | 0/30 | 0/30 |
| 19 | 0/30 | 0/30 | 0/30 |
| 20 | 0/30 | 0/30 | 0/30 |

TABLE 6

Number of broken optical fibers/ Total number of optical fibers tested

| No. | −20° C./+60° C. | −40° C./+85° C. | −40° C./+120° C. |
|---|---|---|---|
| 21 | 10/30 | 10/30 | 23/30 |
| 22 | 12/30 | 12/30 | 22/30 |
| 23 | 12/30 | 12/30 | 26/30 |
| 24 | 0/30 | 5/30 | 6/30 |
| 25 | 0/30 | 4/30 | 4/30 |
| 26 | 0/30 | 4/30 | 5/30 |
| 27 | 0/30 | 5/30 | 5/30 |
| 28 | 0/30 | 4/30 | 7/30 |
| 29 | 0/30 | 2/30 | 5/30 |
| 30 | 0/30 | 6/30 | 6/30 |
| 31 | 0/30 | 0/30 | 4/30 |
| 32 | 0/30 | 0/30 | 5/30 |
| 33 | 0/30 | 0/30 | 5/30 |
| 34 | 0/30 | 0/30 | 3/30 |

TABLE 6-continued

| | Number of broken optical fibers/ Total number of optical fibers tested | | |
|---|---|---|---|
| No. | −20° C./+60° C. | −40° C./+85° C. | −40° C./+120° C. |
| 35 | 0/30 | 0/30 | 4/30 |
| 36 | 0/30 | 0/30 | 0/30 |
| 37 | 0/30 | 0/30 | 0/30 |
| 38 | 0/30 | 0/30 | 0/30 |
| 39 | 0/30 | 0/30 | 0/30 |
| 40 | 0/30 | 0/30 | 0/30 |

As is clear from the above results, the constant "c" is extremely important in relation to the coefficient of thermal expansion and the elastic modulus of the resin used. Particularly, if the temperature change is −20° C. to +60° C., setting of "c" at not less than 1.2 is extremely effective. Further, if the temperature change is −40° C. to +85° C., setting of "c" at not less than 2.0 is extremely effective. Furthermore, if the temperature change is −40° C. to +120° C., setting of "c" at not less than 2.5 is extremely effective.

As mentioned above, according to the present invention, it is possible to prevent the degradation of the light transmission characteristic such as the light insertion loss even under application of heat impact or heat cycles over a wide temperature range.

What is claimed is:

1. A fixing-assembly for an optical transmission member having a core wire and an outer covering, comprising:

a substrate having a receipt groove therein for receiving the core wire of the optical transmission member;

a lid integrated with said substrate;

a receipt space located between said substrate and said lid, for receiving at least the covering of the optical transmission member, wherein the width of said receipt space is greater than that of said receipt groove;

a boundary space zone provided between said receipt space and said receipt groove; and an adhesive surrounding the optical transmission member within said receipt space for fixing the optical transmission member in said receipt space, said adhesive also surrounding the core wire inside the receipt groove to thereby fix the core wire within said receipt groove;

wherein the perimeter of the adhesive filled around the optical transmission member inside said boundary space zone is continuously and linearly reduced in a direction towards an opening of said receipt groove at an end opposed to said receipt space and wherein a constant in the following formula representing a volume-reduced percentage of the thickness of the adhesive around the optical transmission member within said boundary space zone is not less than 1.2:

volume-reduced percentage=$(-\log(a \times b)) \times 100/c$, in which a is an elastic modulus, measured in kg/mm$^2$, of said adhesive, b is a coefficient of thermal expansion of said adhesive, and c is the constant.

2. The fixing assembly of claim 1, wherein the constant is not less than 2.0.

3. The fixing assembly of claim 1, wherein the constant is not less than 2.5.

* * * * *

UNITED STATES PATENT AND TRADEMARK OFFICE
CERTIFICATE OF CORRECTION

PATENT NO : 6,160,947
DATED : December 12, 2000
INVENTOR(S) : Yukihisa OSUGI, Akira HAMAJIMA, Shuhei TOYODA, Yoshinari KOZUKA, and Yoshizumi NAKASUJI It is certified that error appears in the above-identified patent and that said Letters Patent are hereby corrected as shown below:

On title page, item 73, Assignee, replace "NCK" with --NGK--.

Signed and Sealed this

First Day of May, 2001

Attest:

NICHOLAS P. GODICI

*Attesting Officer*       *Acting Director of the United States Patent and Trademark Office*